(12) United States Patent
Hsieh et al.

(10) Patent No.: US 10,866,307 B2
(45) Date of Patent: Dec. 15, 2020

(54) METHOD FOR ANALYZING ERROR AND EXISTENCE PROBABILITY OF MULTI-SENSOR FUSION OF OBSTACLE DETECTION

(71) Applicant: Automotive Research & Testing Center, Changhua County (TW)

(72) Inventors: Min-Shiu Hsieh, Changhua County (TW); Po-Hsiang Liao, Changhua County (TW)

(73) Assignee: AUTOMOTIVE RESEARCH & TESTING CENTER, Changhua County (TW)

( * ) Notice: Subject to any disclaimer, the term of this patent is extended or adjusted under 35 U.S.C. 154(b) by 356 days.

(21) Appl. No.: 15/857,880

(22) Filed: Dec. 29, 2017

(65) Prior Publication Data

US 2019/0204411 A1 Jul. 4, 2019

(51) Int. Cl.
| | |
|---|---|
| *G01S 7/40* | (2006.01) |
| *G01S 13/86* | (2006.01) |
| *G01S 13/931* | (2020.01) |
| *G01S 13/72* | (2006.01) |

(52) U.S. Cl.
CPC .............. *G01S 7/40* (2013.01); *G01S 13/726* (2013.01); *G01S 13/867* (2013.01); *G01S 13/931* (2013.01); *G01S 2013/93185* (2020.01)

(58) Field of Classification Search
CPC ........................................................ G01S 7/40
See application file for complete search history.

(56) References Cited

U.S. PATENT DOCUMENTS

| | | | |
|---|---|---|---|
| 9,429,650 B2 | 8/2016 | Zeng et al. | |
| 2013/0141580 A1* | 6/2013 | Stein .................. | H04N 7/18 348/148 |
| 2015/0161796 A1* | 6/2015 | Choi .................. | H04N 5/33 348/77 |
| 2016/0070265 A1* | 3/2016 | Liu .................... | G01C 21/00 701/3 |
| 2017/0236249 A1* | 8/2017 | Roulet ............... | G06F 3/04847 382/275 |
| 2018/0188368 A1* | 7/2018 | Zuffada ............. | G01S 7/4863 |

* cited by examiner

*Primary Examiner* — Hyun D Park
(74) *Attorney, Agent, or Firm* — McClure, Qualey & Rodack, LLP (57) ABSTRACT

The present disclosure provides a method for analyzing an error and an existence probability of a multi-sensor fusion. The method includes the ab obstacle sensing step, an obstacle predicting step, an error-model providing step, an existence-probability step, a tracking and fusing step and an error accumulating and correcting step. Therefore, by using the method, a plurality of fused obstacle datasets can be obtained, and an accumulation of error variations thereof can be corrected, which can improve the reliability for judging whether the obstacle exist or not.

7 Claims, 13 Drawing Sheets

METHOD FOR ANALYZING ERROR AND EXISTENCE PROBABILITY OF MULTI-SENSOR FUSION OF OBSTACLE DETECTION

BACKGROUND

Technical Field

The present disclosure relates to a method for analyzing an error and an existence probability. More particularly, the present disclosure relates to a method for analyzing an error and an existence probability of a multi-sensor fusion of an obstacle detection.

Description of Related Art

Recently, functions of vehicle computers are becoming sounder, and reliabilities of obstacle detection and classification are getting more and more important for improving the driving safety and for developing toward the future of autonomous vehicle. The classification of the obstacle such as cars, pedestrians, bicycles, utility poles, etc. are set based on the catalog of the system. Therefore, the system can choose to introduce a braking signal or an auto emergency brake, or to operate other actions according to the classification of the obstacle.

There are many types of sensors disposed on the vehicle for detecting obstacles, and photographing systems and radar systems are commonly used. The photographing system is for enhancing article detections and to assist other visual or positioning system, such as a photographing system for capturing an image via a camera and defining the obstacle from the image. The obstacle can be other vehicles, pedestrians or articles on the road. The radar system is for detecting the article on the road. The radar system is for defining the distance, direction or velocity of the article via a radio wave. The radar emitter emits radio-wave pulses, and the article which is located inside a track of the radio-wave pulses will hit by the rfadio-wave pulses and reflect the radio-wave pulses. In addition, the radio-wave pulses reflected by the article send part of the energy to the receiver which is usually located at the same position of the emitter.

Although the above mentioned sensors can detect obstacles, but the reliability is not enough. The detected errors are too large to tracking the obstacle precisely. Consequently, a method for analyzing an error and an existence probability of a multi-sensor fusion of an obstacle detection is required and becomes a pursuit target for practitioners.

SUMMARY

The present disclosure provides a method for analyzing an error and an existence probability of a multi-sensor fusion. The method includes the following steps. An obstacle sensing step is provided, in which a plurality of sensors are provided for detecting the obstacle to generate a plurality of obstacle observing datasets of the obstacle. An obstacle predicting step is provided, in which a processor is provided for generating a plurality of obstacle predicting datasets according to the obstacle observing datasets, respectively. An error-model providing step is provided, in which a plurality of predetermined error-average distributing functions are provided according to the sensors. An existence-probability providing step is provided, in which a plurality of predetermined existence-probability datasets is provided according to the sensors. A tracking and fusing step is provided, in which the processor uses a fusing method for fusing the obstacle observing datasets, the obstacle predicting datasets and the preliminary error-average distributing function to generate a plurality of error variations and a plurality of fused obstacle datasets. An error accumulating and correcting step is provided, in which the processor is used to correct an accumulation of the error variations according to the predetermined existence-probability datasets such that whether the obstacle exists can be judged.

The present disclosure provides a method for analyzing an error and an existence probability of a multi-sensor fusion. The method includes the following steps. An obstacle sensing step is provided, in which a plurality of sensors are provided for detecting the obstacle to generate a plurality of obstacle observing datasets. Each of the obstacle observing datasets includes an observing position and an observing velocity. An obstacle predicting step is provided, in which a processor is provided for generating a plurality of obstacle predicting datasets according to the obstacle observing datasets, respectively. An error-model providing step is provided, a plurality of predetermined error-average distributing functions are provided according to the sensors, and the predetermined error-average distributing functions are prepared beforehand by the following steps. Dispose a dynamical positioning module on a simulating obstacle which simulates the obstacle. Drive the dynamical positioning module to generate a plurality of dynamical positions and using the sensors to get a plurality of simulating observing positions and a plurality of simulating observing velocities of the simulating obstacle corresponding to the dynamical positions. And use the processor for receiving the dynamical positions and the simulating observing positions of the simulating obstacle to calculate differences thereof for generating the predetermined error-average distributing functions. A tracking and fusing step is provided, in which the processor uses a fusing method for fusing the obstacle observing datasets, the obstacle predicting datasets and the preliminary error-average distributing function to generate a plurality of fused obstacle datasets. Each of the predetermined error-average distributing functions is corresponding to each of the simulating observing velocities of the simulating obstacle, one of the sensors comprising a field of view, and the dynamical positions and the simulating observing positions of the simulating obstacle are located inside the field of view.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
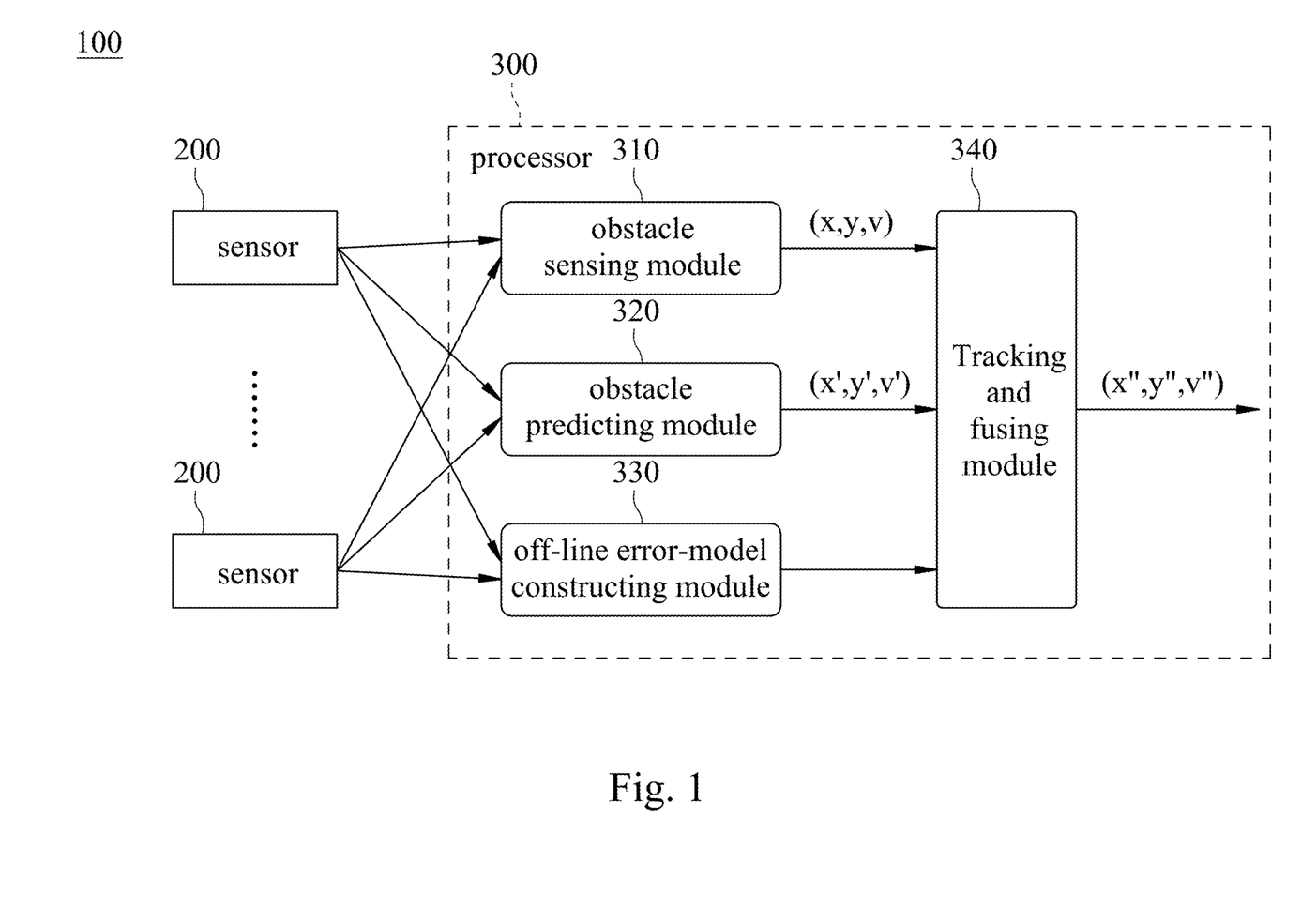
FIG. 1 shows a block diagram of a system for analyzing an error and an existence probability of a multi-sensors fusion according to one embodiment of the simulate disclosure.
Figure 3:
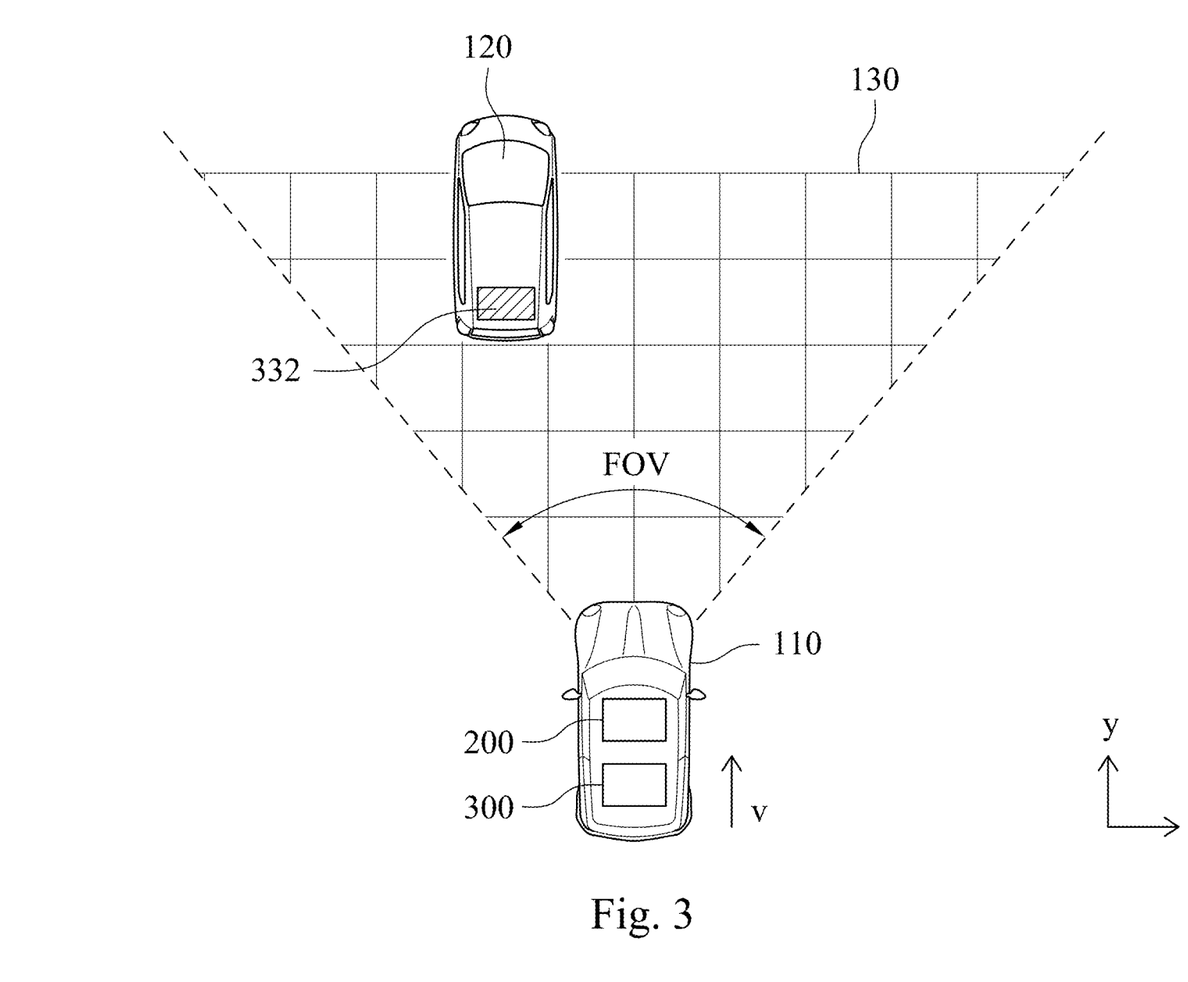
FIG. 3 shows a testing environment of dynamical positions of a simulating obstacle according to the embodiment of FIG. 1.
Figure 4A:
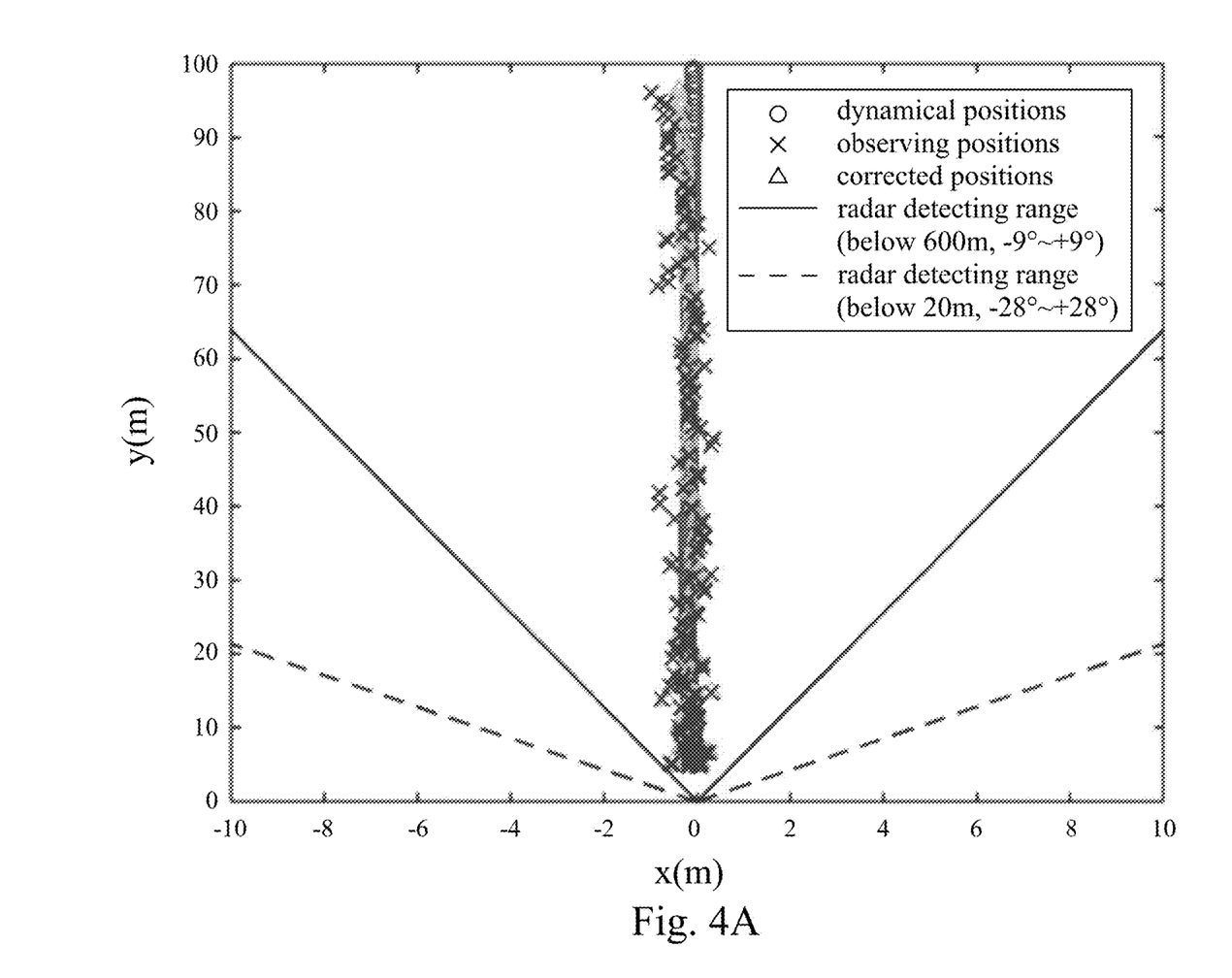
FIG. 4A shows correcting results of one of the sensors according to the embodiment of FIG. 1.
Figure 4B:
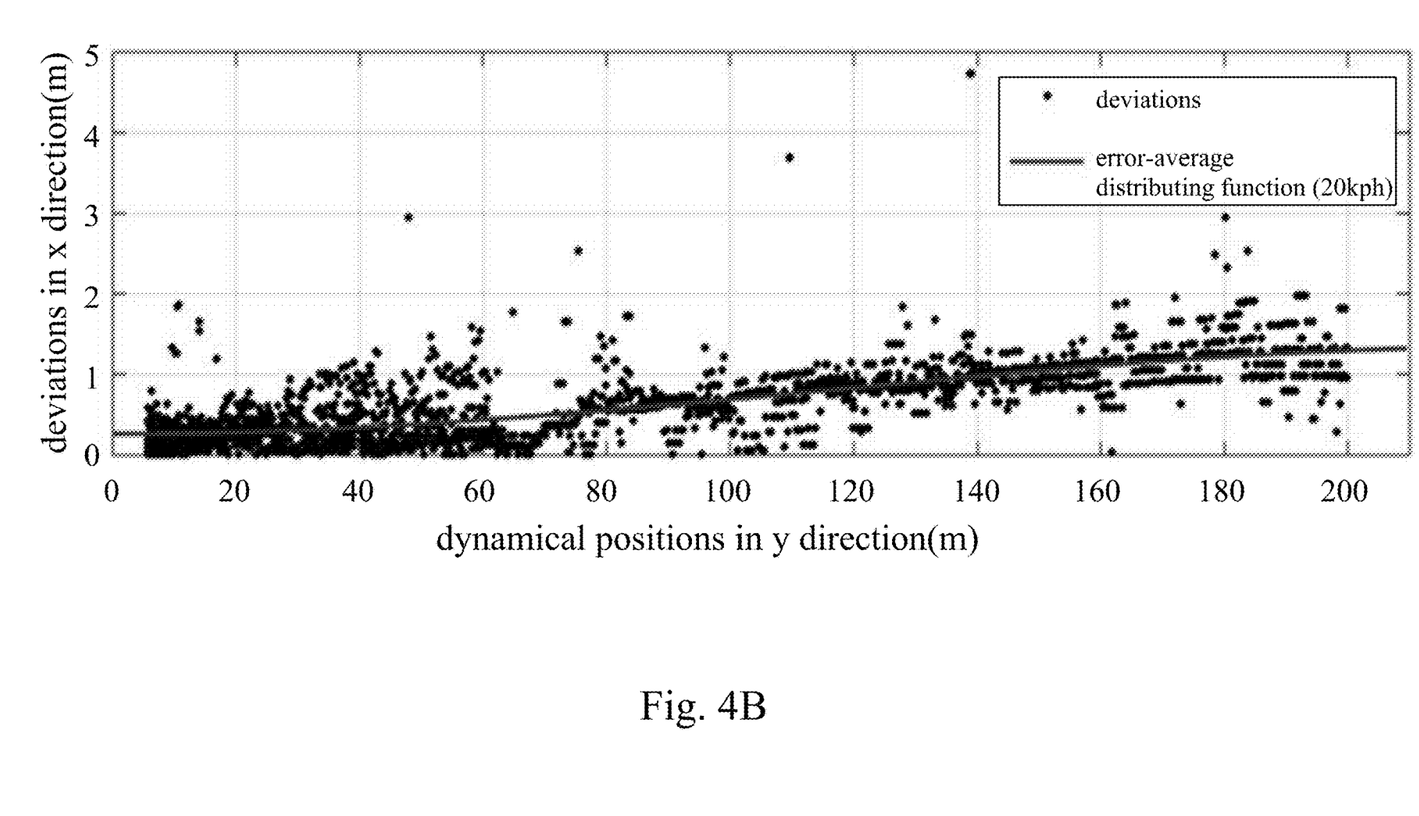
FIG. 4B shows an error-average distributing status corresponding to an observing velocity of 20 kph obtained under the testing environment of FIG. 3.
Figure 4C:
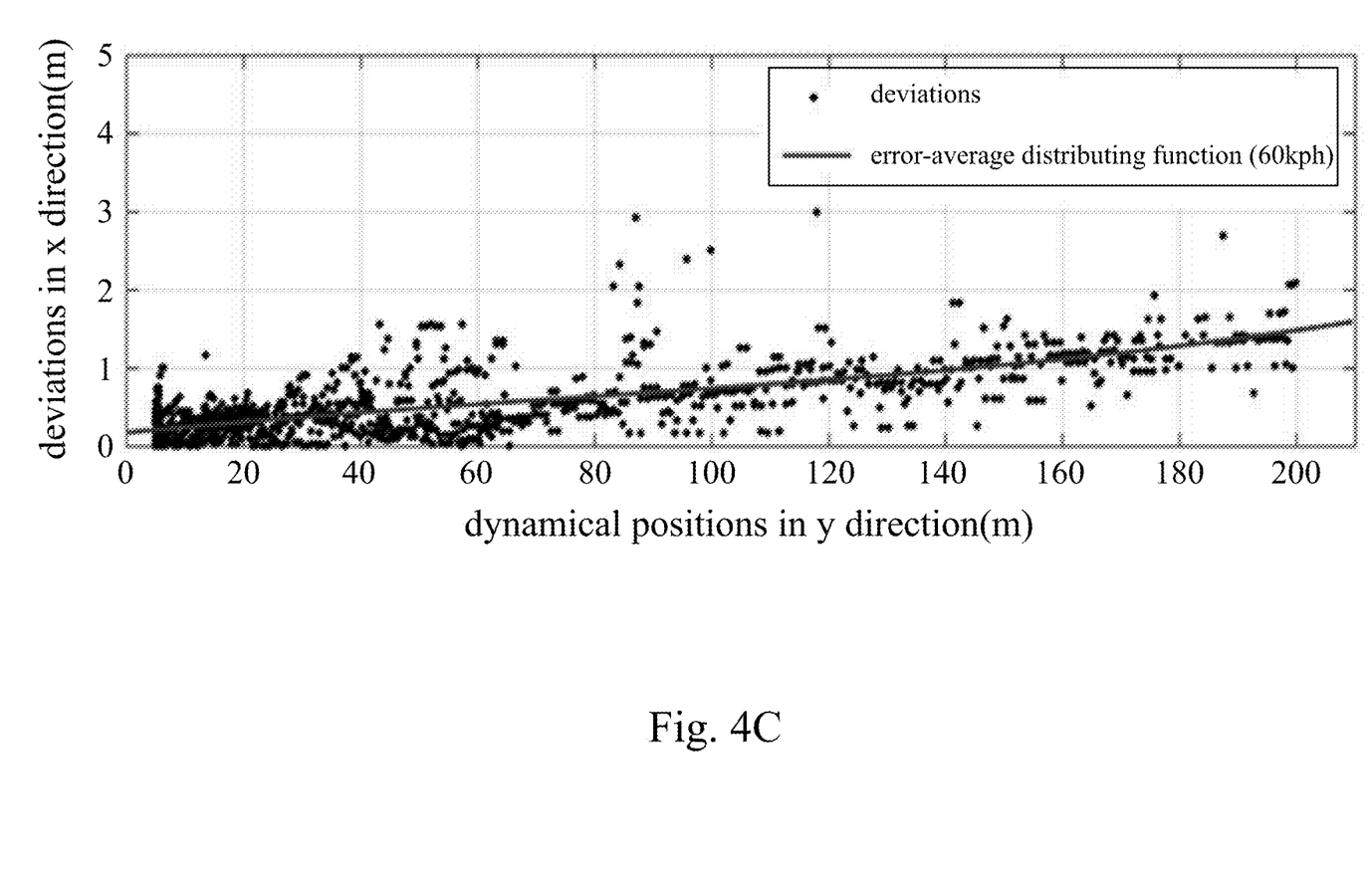
FIG. 4C shows another error-average distributing status corresponding to an observing velocity of 60 kph obtained under the testing environment of FIG. 3.

Please refer to FIGS. 1, 3, 4A, 4B, and 4C. FIG. 1 shows a block diagram of a system 100 for analyzing an error and an existence probability of a multi-sensors fusion according to one embodiment of the present disclosure. FIG. 3 shows a testing environment of dynamical positions of a simulating obstacle 120 according to the embodiment of FIG. 1. FIG. 4A shows correcting results of one of the sensors 200 according to the embodiment of FIG. 1. FIG. 4B shows an error-average distributing status corresponding to an observing velocity of 20 kph obtained under the testing environment of FIG. 3. FIG. 4C shows another error-average distributing status corresponding to an observing velocity of 60 kph obtained under the testing environment of FIG. 3. The system 100 which is disposed at a vehicle 110 includes a plurality of sensors 200 and a processor 300, and the system 100 can assist the vehicle 110 to detect an obstacle on the travel direction of the vehicle 110.

The sensors 200 are disposed at the vehicle 110, and types of the sensors 200 can be different. In the embodiment of FIG. 1, a number of the sensors 200 is two, and one of the sensors 200 is a radar and the other one of the sensors is a camera. The radar can detect a position and a velocity of the obstacle on the travel direction of the vehicle 110, and the camera can detect the position of the obstacle and identify a type of the obstacle. In other embodiment, the number and the types of the sensors are not limited thereto.

The processor 300 is disposed at the vehicle 110 and is signally contacted to the sensors 200, and the processor 300 can be, but not limited to, an electronic control unit, a microprocessor, or an electronic calculator etc. The processor 300 includes an obstacle sensing module 310 and an off-line error-model constructing module 330.

The obstacle sensing module 310 generates a plurality of obstacle observing datasets (x, y, v) after the sensors 200 detect the obstacle, and each of the obstacle observing datasets (x, y, v) includes an observing position (x, y) of the obstacle and an observing velocity v of the obstacle. The observing positions (x, y) are the positions of the obstacle detected by the sensors 200, and the observing velocities v are the moving velocities of the obstacle detected by the sensors 200. The off-line error-model constructing module 330 can construct a plurality of predetermined error-average distributing functions according to the sensors 200 under different testing environments. Each of the predetermined error-average distributing functions is an error-average function between each of the obstacle observing datasets (x, y, v) of the obstacle and a real dataset of the obstacle.

As shown in FIG. 3, a simulated obstacle 120 having a dynamical positioning module 332 is provided. The simulating obstacle 120 simulates the obstacle on the travel direction of the vehicle 110. And the sensors 200 can detect the simulating obstacle 120 and the obstacle sensing module 310 of the processor 300 can generate a plurality of simulating obstacle observing datasets which are also represented by (x, y, v) because the simulating obstacle 120 simulates the obstacle and the simulating obstacle observing datasets simulates the obstacle observing datasets (x, y, v). Hence, each of the simulating obstacle observing datasets (x, y, v) of the simulated obstacle 120 includes a simulating observing position (x, y) and a simulating observing velocity v of the simulating obstacle 120. When constructing the predetermined error-average distributing functions, driving the dynamical positioning module 332 to generate a plurality of dynamical positions, indicated by "o" in FIG. 4A. Additionally, each of the horizontal axes of the diagram in FIGS. 4B and 4C represents the dynamical positions in y direction. The off-line error-model constructing module 330 receives the dynamical positions and the simulating observing positions (x, y) of the simulating obstacle 120 and the simulating velocity v of the simulating obstacle 120 to generate the predetermined error-average distributing functions. Each of the simulating observing positions (x, y) of the simulating obstacle 120 is indicated by "X" in FIG. 4A. Furthermore, as shown in FIGS. 4B and 4C, "•" indicates the error between each of the simulating observing positions of the simulating obstacle 120 and the dynamical position detected by the dynamical positioning module 332. These errors are used to construct the predetermined error-average distributing functions, and the predetermined error-average distributing functions will be changed according to different testing environments. For example, FIG. 4B shows a predetermined error-average distributing function according to a velocity 20 kph, and FIG. 4C shows another predetermined error-average distributing function according to a velocity 60 kph. In addition, the sensor 200 has a field of view FOV, and the dynamical positions and the simulating observing positions (x, y) are located in the field of view FOV. A plurality of grids 130 can be virtually formed inside the field of view FOV by the processor 300 to assist the processor 300 to measure the distances of x and y. The dynamical positioning module 332 can be a RTK-GPS in the embodiment such that the dynamical positions are the real positions of the simulating obstacle 120. Hence, each of the simulating observing positions (x, y) will compare to each of the dynamical positions; thus, the predetermined error-average distributing functions can be conducted by the differences thereof. Accordingly, the predetermined error-average distributing functions can be considered as references when correcting the observing positions of the obstacle (real obstacle).

The processor 300 can further include an obstacle predicting module 320 and a tracking and fusing module 340. The obstacle predicting module 320 is for generating a plurality of obstacle predicting datasets (x', y', v') according to the sensors 200. The status of predicting obstacles is obtained from the pre-step observational points, that is, x'=x+vΔt; y'=y+vΔt; v'=v+at. The predicting positions (x', y') represent the predicted positions of the obstacle, and the predicting velocity v' represents the predicted velocity of the obstacle. The tracking and fusing module 340 uses a fusing method to fuse the obstacle observing datasets (x, y, v), the obstacle predicting datasets (x', y', v') and the predetermined error-average distributing functions to generate a plurality of fused obstacle datasets (x", y", v"). And in the embodiment, a Kailman filter is used in the fusing method. The fused positions (x", y") represents the positions of the obstacle after the tracking and the fusing module 340 is operated, and the fused velocity v" represents the velocity of the obstacle after the tracking and the fusing module 340 is operated. In other words, the tracking and fusing module 340 is signally contacted to the obstacle sensing module 310, the obstacle predicting module 320 and the off-line error-model constructing module 330. Because there are two sensors 200 in the embodiment of FIG. 1, which are the radar and the camera, each of the sensors 200 has their own obstacle observing datasets (x, y, v) and predetermined error-average distributing functions, and each of the observing positions (x, y) will be corrected by the error-average distributing function corresponding to the observing velocity v. Through the correction of the predetermined error-average distributing functions, a plurality of corrected positions can be get, which are indicated by "Δ" in FIG. 4A. Particularly, because the predetermined error-average distributing functions are prepared beforehand, the observing datasets generating on the road can be corrected dynamically. Moreover, in the embodiment, after the obstacle observing datasets (x, y, v) are corrected by the corresponding predetermined error-average distributing functions, the corrected observing datasets in which the corrected positions are included are produced. In multi-sensors fusion, the observing datasets of the sensors, the predicting obstacle datasets from the observations and the predetermined error-average distributing functions of the sensors enter into the Kalman filter to generate fused obstacle datasets (x", y", v"). In the Kalman filter, the weights of the corrected observing datasets of the sensors are modified depended on the predetermined error distributing of the sensors, respectively. That is, if the errors are widely distributed, the weight is low; and if the errors are concentrated, the weigh is high.

Figure 2:
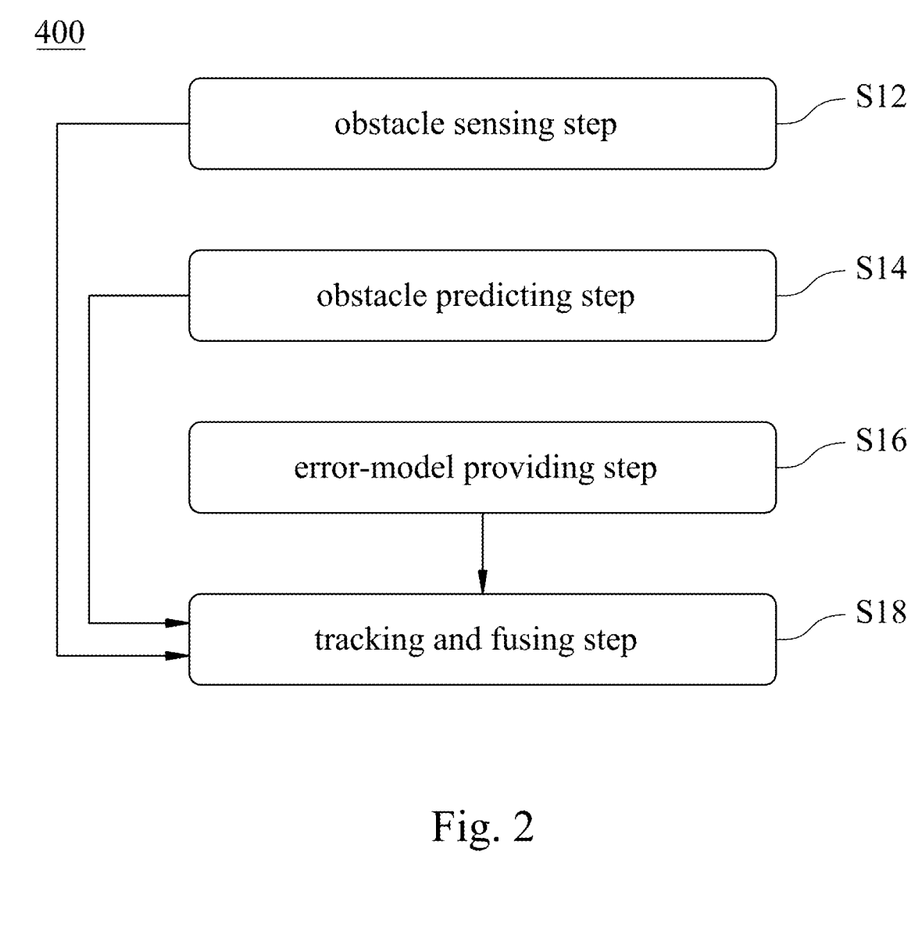
FIG. 2 shows a flow chart of a method for analyzing an error and an existence probability of a multi-sensor fusion according to another embodiment of the present disclosure.

Please refer to FIG. 2. FIG. 2 shows a flow chart of a method 400 for analyzing an error and an existence probability of a multi-sensor fusion according to another embodiment of the present disclosure. The method 400 is for detecting the obstacle on a travel direction of the vehicle 110. The method 400 includes an obstacle sensing step S12, an obstacle predicting step S14, an error-model providing step S16 and a tracking and fusing step S18.

In the obstacle sensing step S12, the sensors 200 are provided for detecting the obstacle, a real obstacle on the travel direction of the vehicle 110, to generate the plurality of obstacle observing datasets (x, y, v), that is, the obstacle sensing module 310 will generate the plurality of obstacle observing datasets (x, y, v) after the sensors 200 detecting the obstacle.

In the obstacle predicting step S14, the processor 300 generates the plurality of obstacle predicting datasets (x', y', v'). Precisely, the obstacle predicting module 320 will generate the plurality of obstacle predicting datasets (x', y', v') after the sensors 200 detecting the obstacle.

In error-model providing step S16, the predetermined error-average distributing functions are provided, and the predetermined error-average distributing functions are prepared beforehand according to the above mentioned steps.

In the tracking and fusing step S18, the processor 300 uses a fusing method to fusing the obstacle observing datasets (x, y, v), the obstacle predicting datasets (x', y', v') and the predetermined error-average distributing functions to generate the fused obstacle positions (x", y", v"). Precisely, a Kalman filter is used in the fusing method. The kalman filter is operated via the tracking and fusing module 340, and each of the fused obstacle positions (x", y", v") includes a fused position (x", y") and a fused velocity v. In other embodiment, each of the fused obstacle positions (x", y", v") can further includes an obstacle catalog to indicated a type of the obstacle, such as pedestrians, cars and so on. Therefore, the method 400 can provide an error analysis beforehand, and construct the predetermined error-average distributing functions base on the testing environments, the simulating obstacle 120 and the status of the vehicle 110 to correct the positions and to generate the fused obstacle datasets (x", y", v) with lower error and higher reliability.

Figure 5A:
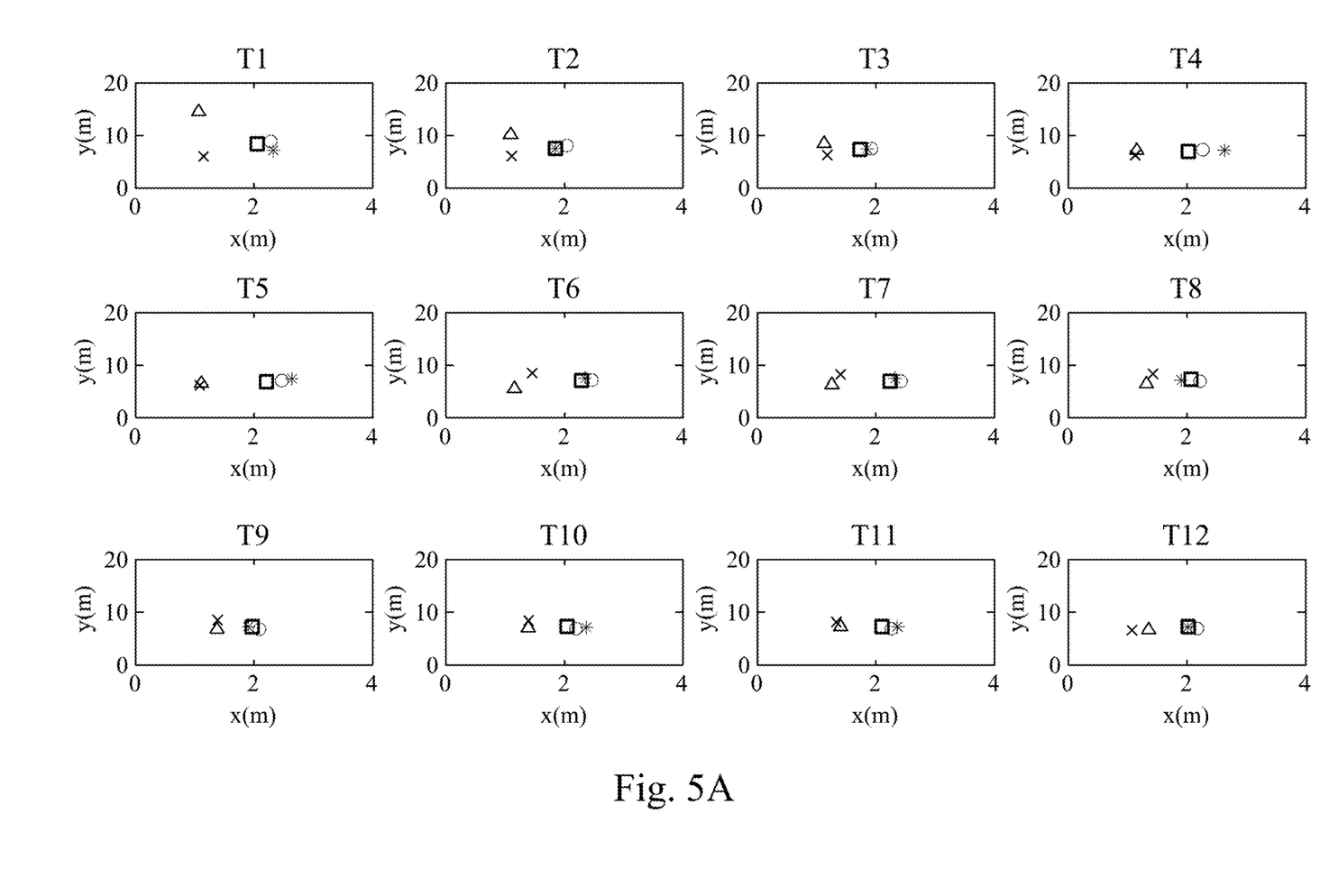
FIGS. 5A to 5C show the tracking and fusing results of the sensors 200 corresponding to time T1 to time T30, respectively, according to the embodiment of FIG. 2.
Figure 5B:
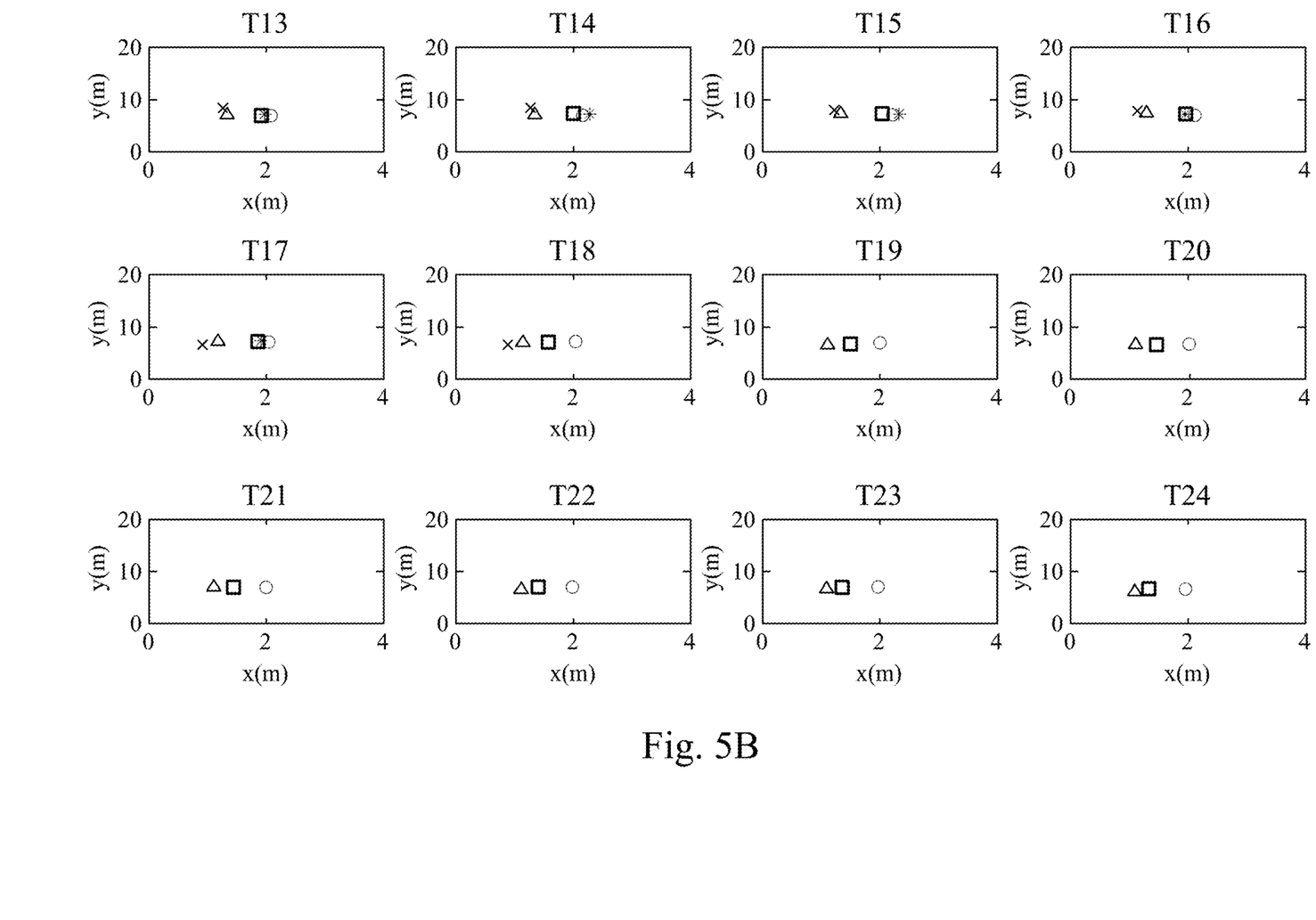
Figure 5C:
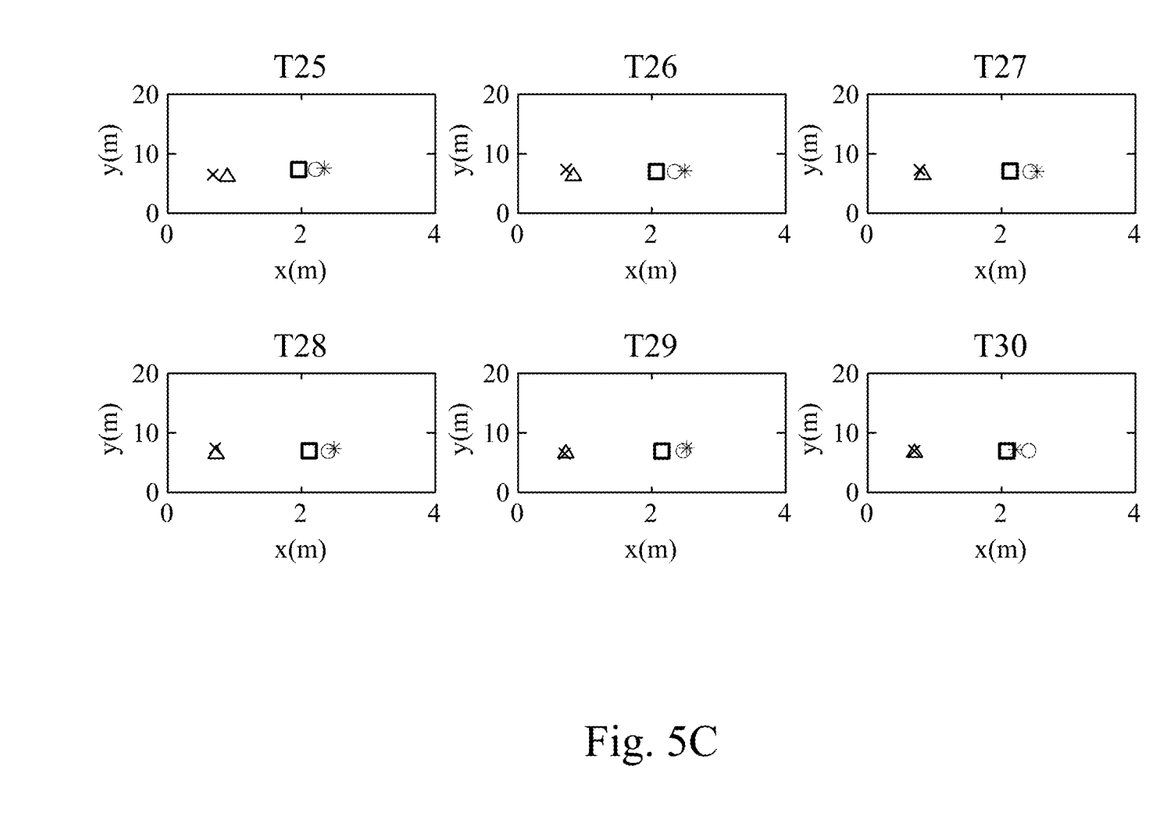

Please refer to FIGS. 1, 2, 3, 5A, 5B and 5C. FIGS. 5A to 5C show the tracking and fusing results of the sensors 200 corresponding to time T1 to time T30, respectively, according to the embodiment of FIG. 2. As shown in FIGS. 5A to 5C, "x" indicates the observing position (x, y) of the obstacle detecting by the camera, and "Δ" indicates a corrected position thereof. Moreover, "*" indicates the observing position (x, y) of the obstacle detecting by the radar, and "○" indicates a corrected position thereof. "□" indicates the fused obstacle dataset (s", y", v"). The tracking and fusing results are obtained from time T1 to time T30, and time T1 to time T30 are continuous. As shown in FIGS. 5A to 5C, the detection of the radar is more precise than the detection of the camera; therefore, through the fusion of the sensors and the dynamical correction of the obstacle observing position, the fused obstacle position has high reliability.

Figure 6:
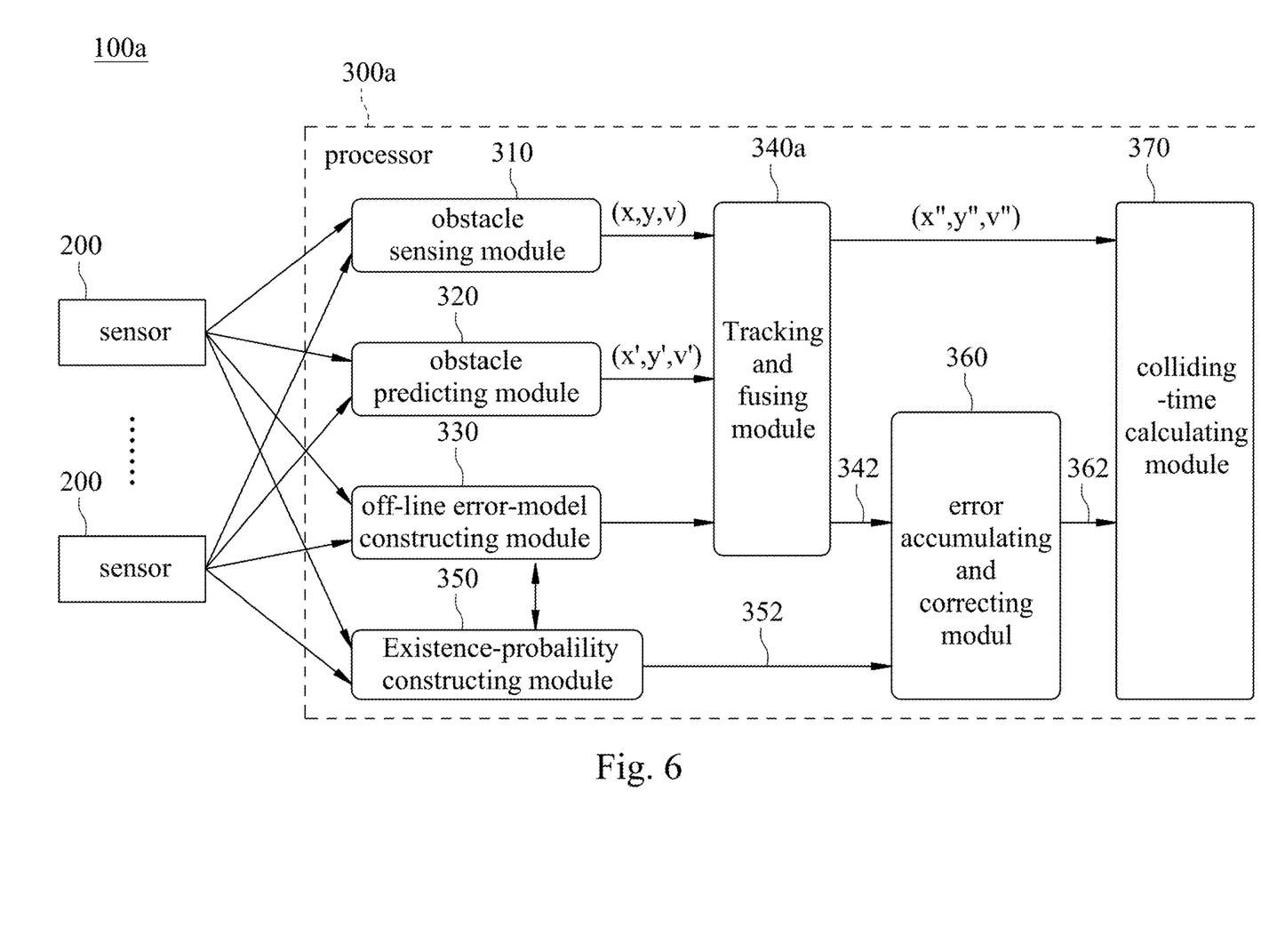
FIG. 6 shows a block diagram of a system for analyzing an error and an existence probability of a multi-sensors fusion according to further another embodiment of the present disclosure.

Please refer to FIG. 1 and FIG. 6. FIG. 6 shows a block diagram of a system 100a for analyzing an error and an existence probability of a multi-sensors fusion according to further another embodiment of the present disclosure. The system 100a which is disposed at a vehicle 110 includes a plurality of sensors 200 and a processor 300a, and the processor 300a includes an obstacle sensing module 310, an obstacle predicting module 320, an off-line error-model constructing module 330, a tracking and fusing module 340a, an existence-probability constructing module 350, an error accumulating and correcting module 360 and an colliding-time calculating module 370. The sensors 200, the obstacle sensing module 310, the obstacle predicting module 320 and the off-line error-model constructing module 330 are similar to the sensors 200, the obstacle sensing module 310, the obstacle predicting module 320 and the off-line error-model constructing module 330 in FIG. 1 and will not be describe here again.

The tracking and fusing module 340a uses a fusing method to fuse the obstacle observing datasets (x, y, v), the obstacle predicting datasets (x', y', v') and the predetermined error-average distributing functions to generate a plurality of fused obstacle positions (x", y", v") and a plurality of error variations 342 through Kalman filter iterations. In the embodiment, a Kalman filter is used in the fusing method and the number of the sensors 200 is two. The sensors are a radar and a camera, respectively. In other embodiment, the number of the sensors is more than two, and the types of the sensors are not limited to radars or cameras.

The existence-probability constructing module 350 is signally connected to the sensors and the off-line error-model constructing module 330. The existence-probability constructing module 350 generates a plurality of predetermined existence-probability datasets 352 beforehand. The predetermined existence-probability datasets 352 indicate existing probabilities of the signal detected by the sensors 200, which can be deemed as the reliability of the sensing result. For example, a true and false distrusting datasets are conducted beforehand according to the sensors under different testing environments, in which "true" means the obstacle observing dataset is a correct data and "false" means the obstacle observing data is an incorrect data. The detection trusting (distrusting) probability of the simulating obstacles is the average of detection (non-detection) rates in an amount of testing results.

The error accumulating and correcting module 360 is signally connected to the tracking and fusing module 340a and the existence-probability constructing module 350, and the error accumulating and correcting module 360 corrects an accumulation of the error variations 342 according to the predetermined existence-probability datasets 352 such that whether the obstacle exists or not can be judged. Precisely, the error accumulating and correcting module 360 stores a predetermined threshold value and compares the predetermined threshold value and the accumulation to judge whether the obstacle exist or not. When the accumulation is smaller than or equal to the threshold value, the obstacle is deemed to exist. Oppositely, when the accumulation is larger than the threshold value, the obstacle is deemed to be absent. Furthermore, the error accumulating and correcting module 360 will correct the accumulation and output existing status datasets 362 corresponding to the fused obstacle datasets (x", y", v").

The colliding-time calculating module 370 receives the fused obstacle datasets (x", y", v") and the existing status datasets 362 to calculate a colliding-time of the vehicle 110 which can be a reference for a driver. Therefore, through correcting the accumulation of the error variations 342 by the predetermined existence-probability datasets 352 of multi-sensors, the reliability of the judgement of the obstacle is increased. In addition, through the conduction of the predetermined error-average distributing functions by using the GPS and the simulating obstacle 120 under different testing environments, the corrected observing datasets can be obtained to generate fused obstacle datasets (x", y", v") with high reliability and lower errors. Furthermore, because whether the obstacle exist is judged base on the accumulation corrected by the predetermined existence-probability datasets 352, the reliability of the judgement is increased.

Please refer to FIGS. 5A to 5C, 6, 7, 8A and 9B. The method includes an obstacle sensing step S21, an obstacle predicting step S22, an error-model providing step S23, a tracking and fusing step S24, an existence-probability providing step S25, an error accumulating and correcting step S26 and a colliding-time calculating step S27. The obstacle sensing step S21, the obstacle predicting step S22 and error-module providing step S23 are similar to the obstacle sensing step S12, the obstacle predicting step S14 and the error-model providing step S16 mentioned above and will not be described again.

Figure 7:
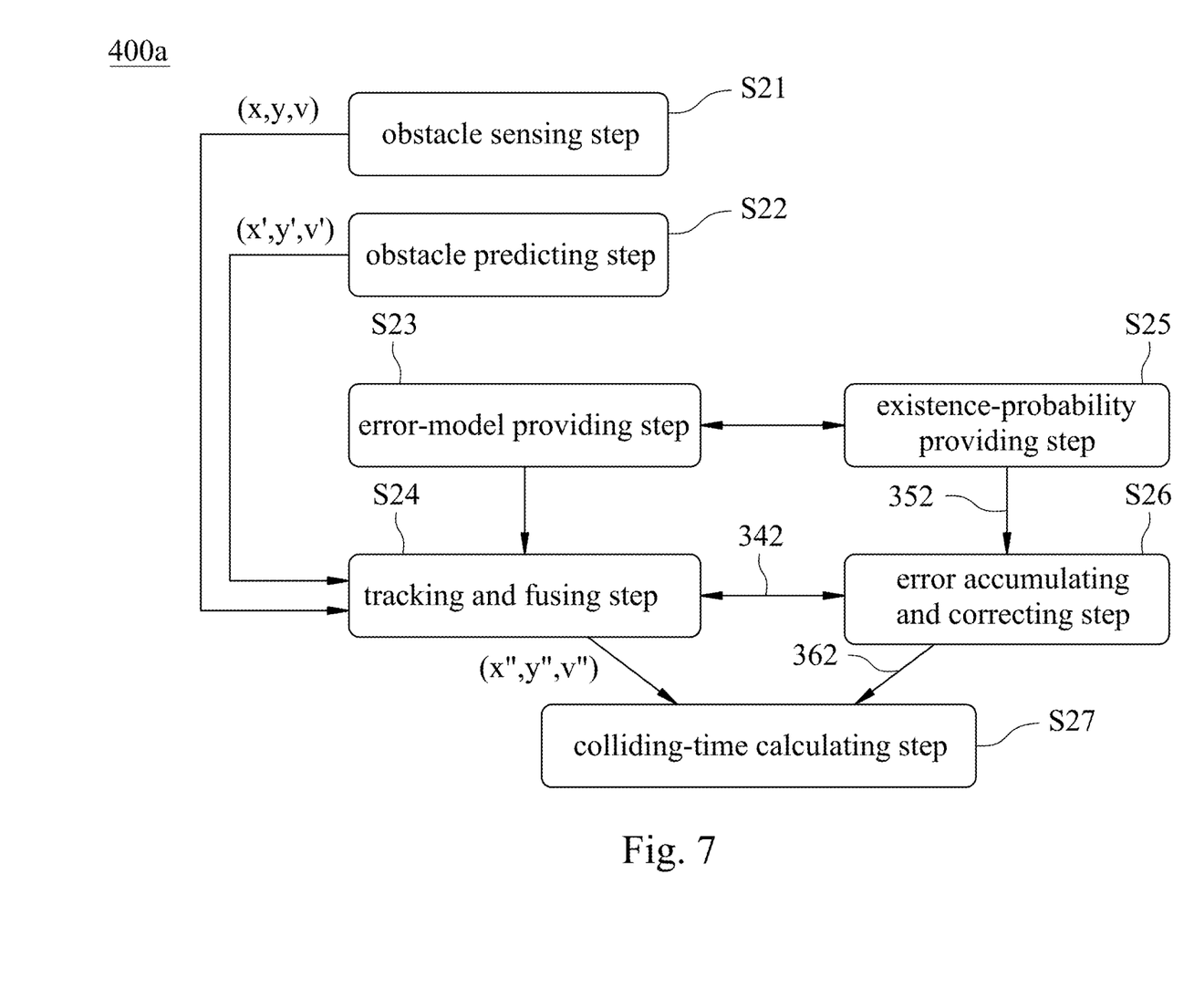
FIG. 7 shows a flow chart of a method for analyzing an error and an existence probability of a multi-sensor fusion according to yet another embodiment of the present disclosure.
Figure 8A:
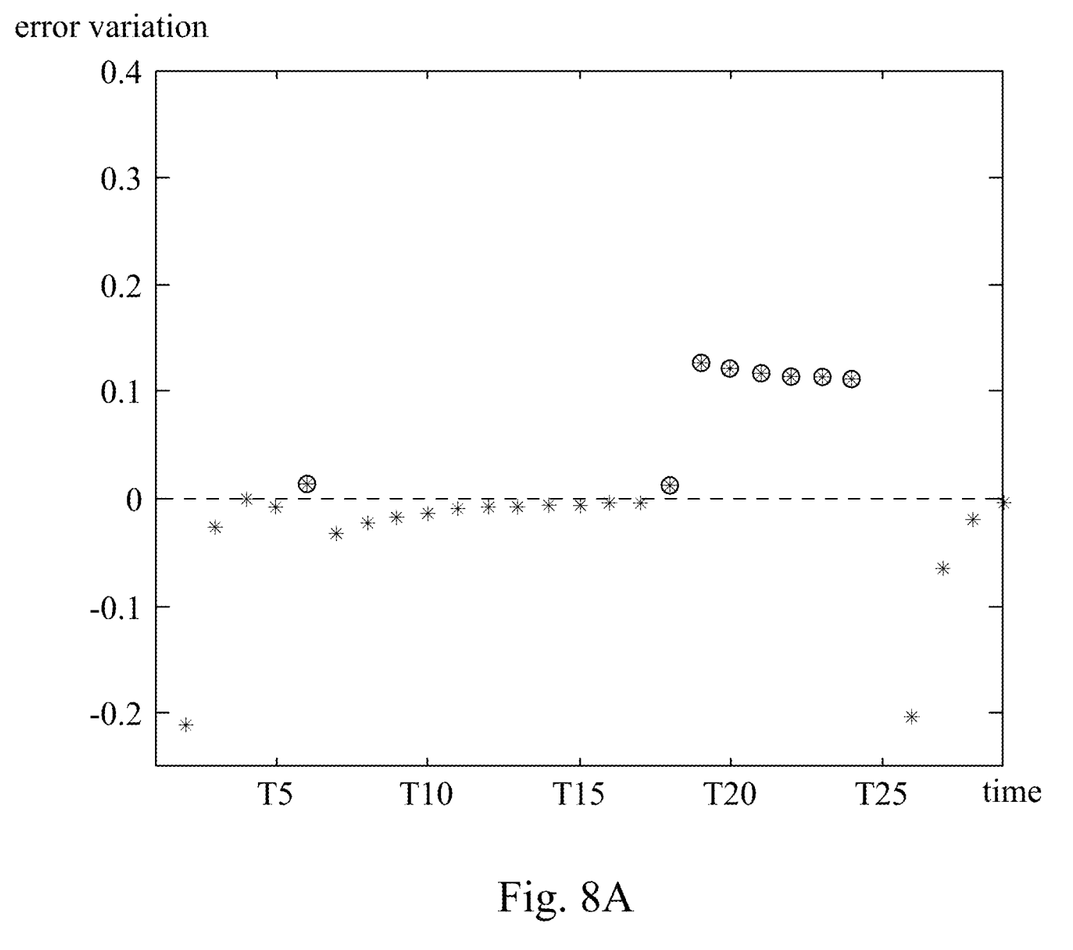
FIG. 8A shows error variations.
Figure 8B:
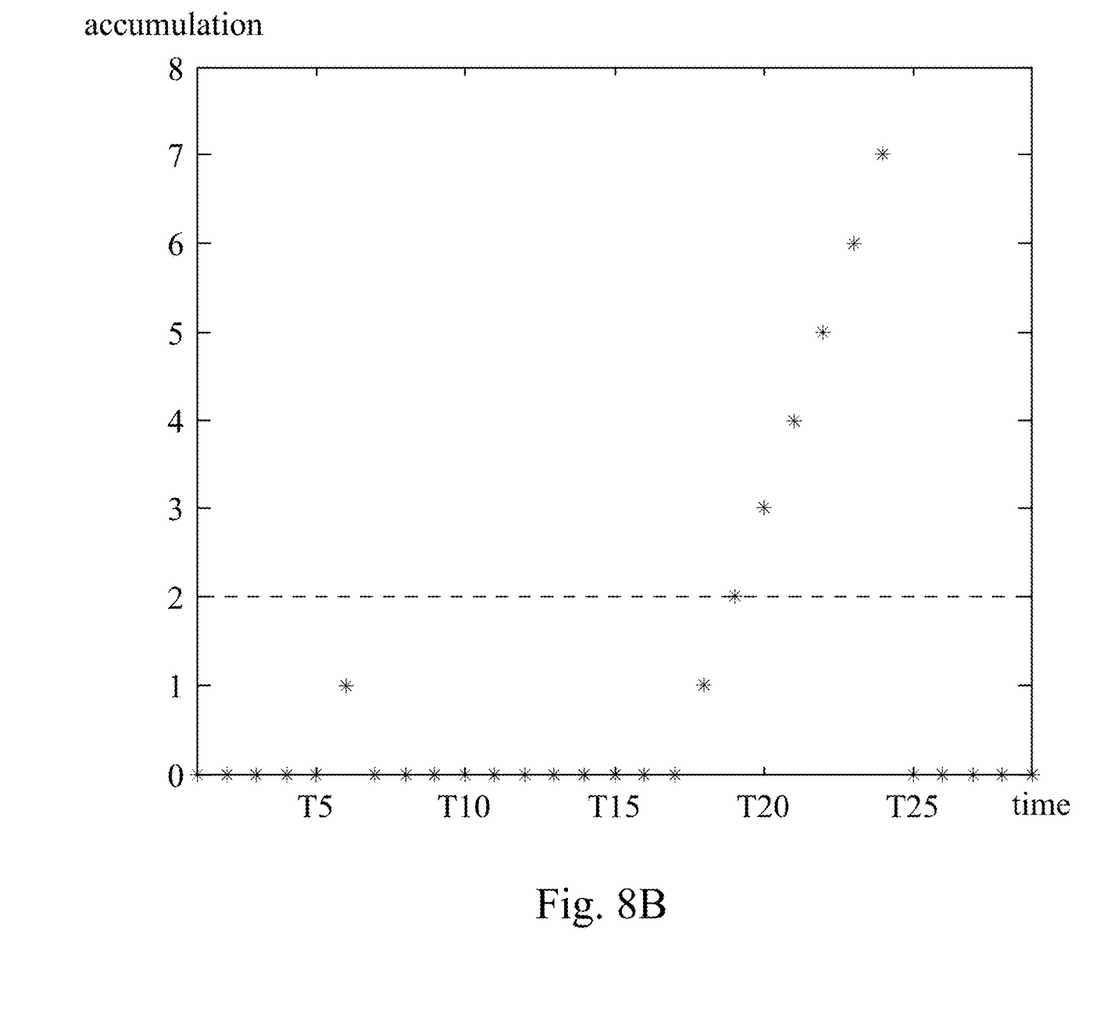
FIG. 8B shows accumulations of the error variations.

In the tracking and fusing step S24, the tracking and fusing module 340a using the fusing method to fuse the obstacle observing datasets (x, y, v), the obstacle predicting datasets (x', y', v') and the predetermined error-average distributing functions to generate a plurality of error variations 342 and a plurality of fused obstacle datasets (x", y", v").

In the existence-probability providing step S25, the predetermined existence-probability datasets 352 are provided by the existence-probability constructing module 350, and the predetermined existence-probability datasets 352 are relative to the errors of the sensors when conducting the predetermined error-average distributing functions. When the errors are widely distributed, the existing-probability datasets 352 have low reliability, which means the sensor 200 is not precise. On the other hand, when the errors are concentrated, the existing-probability datasets 352 have high reliability, which means the sensor 200 is precise.

In the error accumulating and correcting step S26, the error accumulating and correcting module 360 judges whether the obstacle exist or not based on the accumulation corrected by the predetermined existence-probability datasets 352. Precisely, the error accumulating and correcting module 360 stores a predetermined threshold value and compares the predetermined threshold value and the accumulation to judge whether the obstacle exist or not. When the accumulation is smaller than or equal to the threshold value, the obstacle is deemed to exist. Oppositely, when the accumulation is larger than the threshold value, the obstacle is deemed to be absent. Furthermore, the error accumulating and correcting module 360 will correct the accumulation and output the existing status datasets 362 corresponding to the fused obstacle datasets (x", y", v"). For example, as shown in FIGS. 5A to 5C, 8A and 8B, the observing position (x, y) cannot be obtained from time T19 to time T24 owning to two possible reasons. One reason is that both of the sensors are broken, and the predetermined existence-probability dataset 352 is low (for example, the predetermined existence-probability dataset 352 is equal to 30%), that is, the detecting reliabilities of the sensors 200 are low. The other reason is that both the sensors are normal but the signals are interfered, as a result, the observing positions (x, y) are changed. The predetermined existence-probability dataset 352 is high (for example, the predetermined existence-probability dataset 352 is equal to 90%), that is, the detecting reliabilities of the sensors 200 are high. Furthermore, the error variations 342 are positive from time T19 to time T24, which mean the errors occur continuously. At the same time, the accumulation of the error variations 342 becomes larger because the error times accumulating from time T19 to time T24. The threshold value is two in the embodiment, and when the accumulation is larger than two, it means the both of the sensor fail or the obstacle does not exist. And what the real reason is will be considered by combing the predetermined existence-probability and the sensors. Oppositely, when the accumulation is smaller than two, the obstacle exists.

In the colliding-time calculating step S27, the colliding-time calculating module 370 receives the fused obstacle datasets (x", y", v") and the existing status datasets 362 to calculate a colliding-time of the vehicle 110, which can be a reference for a driver. Therefore, the method 400a uses the predetermined existence-probability datasets 352 to correct the accumulation of the error variations 342 to judge whether the obstacle exist or not, as a result, the reliability is increased. Furthermore, the method can be adapted in autonomous emergency braking system and autonomous driving system.

Based on the above mentioned embodiment, the present disclosure includes the flowing advantages: (1) through the predetermined existence-probability datasets to correct the accumulation of the error variations, the judgement of whether the obstacle exist has high reliability and a dynamical result can be obtained; (2) conducting the predetermined error-average distributing function by the GPS and the simulating obstacle under different environments, the position of the obstacle can be dynamically corrected, and a fused obstacle datasets with high reliability can be generated; and (3) through judging whether the obstacle exist or not according to the accumulation corrected by the predetermined existence-probability datasets, the reliability of the judgement is increased and the problem of low reliability and large error can be solved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A method for analyzing an error and an existence probability of a multi-sensor fusion, which is for detecting an obstacle on a travel direction of a vehicle, the method comprising:
   providing a plurality of sensors to detect the obstacle to generate a plurality of observing positions of the obstacle and a plurality of observing velocities of the obstacle;
   providing a processor to generate a plurality of predicting positions of the obstacle and a plurality of predicting velocities of the obstacle according to the observing positions of the obstacle and the observing velocities of the obstacle, respectively;
   providing a plurality of predetermined error-average distributing functions according to the sensors, wherein each of the predetermined error-average distributing functions is an error-average function between simulating obstacle observing datasets of a simulating obstacle and real datasets of the simulating obstacle;
   providing a plurality of predetermined existence-probability datasets according to the sensors, wherein each of the predetermined existence-probability datasets is an existing probability of a signal detected by one of the sensors;
   using the processor to fuse the observing positions of the obstacle and the observing velocities of the obstacle, the predicting positions of the obstacle and the predicting velocities of the obstacle and the preliminary error-average distributing function to generate a plurality of error variations and a plurality of fused obstacle datasets;
   using the processor to correct an accumulation of the error variations according to the predetermined existence-probability datasets and making a judgement on whether or not the obstacle exists, wherein the processor stores a predetermined threshold value, the processor making the judgement on whether or not the obstacle exist by comparing the accumulation and the threshold value and when the accumulation is smaller than or equal to the threshold value, the obstacle is deemed to exist and when the accumulation is larger than the threshold value, the obstacle is deemed to be absent; and introducing a braking signal or an auto emergency brake according to the judgement that the obstacle exists.

2. The method of claim 1, wherein a Kalman Filter is used in the fusing method, and each of the fused obstacle datasets comprises a fused obstacle position, a fused obstacle velocity and a fused obstacle type.

3. The method of claim 1, wherein one of the sensors is a radar and another one of the sensors is a camera.

4. The method of claim 1, wherein the predetermined error-average distributing functions are prepared beforehand by:
   disposing a dynamical positioning module on the simulating obstacle which simulates the obstacle;
   driving the dynamical positioning module to generate a plurality of dynamical positions and using the sensors to get a plurality of simulating observing positions of the simulating obstacle and a plurality of simulating observing velocities of the simulating obstacle corresponding to the dynamical positions; and
   using the processor for receiving the dynamical positions and the simulating observing positions of the simulating obstacle to calculate differences thereof for generating the predetermined error-average distributing functions;
   wherein each of the predetermined error-average distributing functions is corresponding to each of the simulating observing velocities of the simulating obstacle, one of the sensors comprising a field of view, and the dynamical positions and the simulating observing positions of the simulating obstacle are located inside the field of view.

5. A method for analyzing an error and an existence probability of a multi-sensor fusion, which is for detecting an obstacle on a travel direction of a vehicle, the method comprising:
   providing a plurality of sensors to detect the obstacle to generate a plurality of obstacle observing datasets, wherein each of the obstacle observing datasets comprises a observing position and a observing velocity;
   providing a processor to generate a plurality of predicting positions of the obstacle and a plurality of predicting velocities of the obstacle according to the observing positions of the obstacle and the observing velocities of the obstacle, respectively;
   providing a plurality of predetermined error-average distributing functions according to the sensors, wherein the predetermined error-average distributing functions are prepared beforehand by:
   disposing a dynamical positioning module on a simulating obstacle which simulates the obstacle;
   driving the dynamical positioning module to generate a plurality of dynamical positions and using the sensors to get a plurality of simulating observing positions and a plurality of simulating observing velocities of the simulating obstacle corresponding to the dynamical positions; and
   using the processor to receive the dynamical positions and the simulating observing positions of the simulating obstacle to calculate differences thereof for generating the predetermined error-average distributing functions;
   using the processor to fuse the observing positions of the obstacle and the observing velocities of the obstacle, the predicting positions of the obstacle and the predicting velocities of the obstacle and the preliminary error-average distributing function to generate a plurality of fused obstacle datasets and a plurality of error variations;
   using the processor to correct an accumulation of the error variations according to a predetermined existence-probability datasets and making a judgement on whether or not the obstacle exists, and introducing a braking signal or an auto emergency brake according to the judgement that the obstacle exists;
   wherein each of the predetermined error-average distributing functions is corresponding to each of the simulating observing velocities of the simulating obstacle, one of the sensors comprising a field of view, and the dynamical positions and the simulating observing positions of the simulating obstacle are located inside the field of view.

6. The method of claim 5, wherein in Kalman Filter is used in the fusing method, and each of the fused obstacle datasets comprises a fused obstacle position, a fused obstacle velocity and a fused obstacle type.

7. The method of claim 5, wherein one of the sensors is a radar and another one of the sensors is a camera.

* * * * *